United States Patent Office 2,758,994
Patented Aug. 14, 1956

2,758,994

PRODUCTION OF URACILS FROM OXAZINONE

Richard Norman Lacey, Hull, England, assignor to The Distillers Company Limited, Edinburgh, Scotland No Drawing. Application May 29, 1953, Serial No. 358,573

Claims priority, application Great Britain June 10, 1952

8 Claims. (Cl. 260—244)

This invention relates to a process for the production of 4-methyluracils and has as an object the provision of a process whereby such uracils may be synthesised from readily available materials. Uracil derivatives find application in the pharmaceutical field.

According to the present invention, there is provided a process for the production of a 4-methyluracil comprising the step of reacting diketene with an isothiourea to produce an oxazinone, as hereinafter defined.

There is also provided a process for the production of a 4-methyluracil comprising the step of subjecting an oxazinone as hereinafter defined to the action of an aqueous mineral acid, whereby an oxazindione and/or a 4-methyluracil are/is obtained.

There is furthermore provided a process for the production of a 4-methyluracil comprising the step of reacting an oxazindione with an amino compound as hereinafter defined.

The oxazinones and oxazindiones have not been described before, and constitute valuable intermediates for the synthesis of 4-methyluracils in accordance with this invention.

The above chemical reactions are believed to take place in accordance with the following equations in which the reactants and products are defined by the formulae appearing therein:

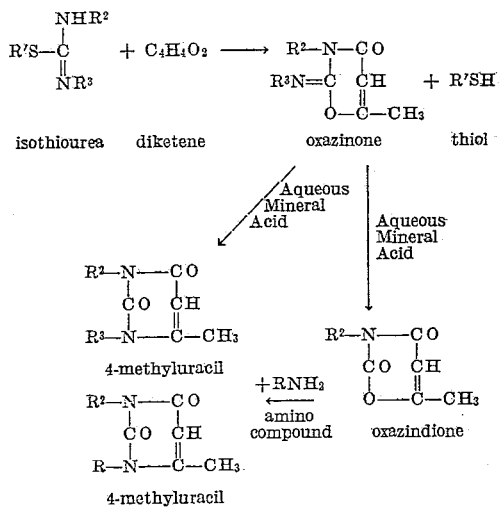

where R is an alkyl or aralkyl group or a hydrogen atom, $R^1$ is an alkyl or aralkyl group and $R^2$ and $R^3$ are alkyl, aralkyl or aryl groups.

The first step of the process, comprising reacting an isothiourea with diketene is preferably carried out in an inert diluent which is a solvent for the starting materials. Solvents which are suitable for this purpose include most of the commonly used organic solvents except those containing reactive groups such as hydroxyl, amino or mercapto groups. For example, liquid hydrocarbons and chlorinated hydrocarbons such as benzene and carbon tetrachloride, ketones such as methyl isobutyl ketone, ethers such as di-isopropyl ether and esters such as butyl acetate may be used. The temperatures are not critical and may lie between 40° and 200° C., preferably about 100° C. The reaction is vigorous and cooling may be required, and consequently it has been found advantageous to carry out the reaction at the boiling points of the diluent media employed, whereby the heat of the reaction may be dissipated in supplying the latent heat necessary to vaporise the solvent. The diluents chosen in such cases should therefore have boiling points in the region of the temperature at which it is desired to carry out the reaction. The order or manner of mixing the reactants is not in any way critical, but it is often convenient to add the diketene slowly to the other constituents of the reaction mixture whereby the control of the reaction is facilitated.

The substituted oxazinone may be recovered in any suitable way such as, for instance, evaporation of the diluent medium and vacuum distillation of the residue.

The second stage of the process, comprising subjecting the oxazinone to the action of an aqueous mineral acid, may give rise both to an oxazinedione by direct hydrolysis of the imino group at the 2-position of the molecule and to a 4-methyluracil by rearrangement. The extent to which either of these products is formed depends largely on the nature of the substituent R groups, and also on the conditions under which the aqueous mineral acid acts. In some cases, for instance in the reaction of 3-benzyl-2:3-dihydro-6-methyl-2-phenylimino-1:3(4)-oxazin-4-one with dilute hydrochloric acid of 5–10% concentration by weight under refluxing conditions, the uracil is the main product and only small quantities of oxazindione are formed. However in other cases, for instance in the reaction of 2:3-dihydro-3:6-dimethyl-2-phenylimino-1:3(4)-oxazin-4-one with hydrochloric acid of 10% concentration by weight under refluxing conditions, the oxazindione is the main product. The temperature at which this step is carried out and the concentration and choice of the mineral acid will therefore depend to some extent on the nature of the substituents of the oxazinone. In some cases, moreover, it may be more convenient to introduce a given substituent into the molecule of the 4-methyluracil by means of the amino compound used in the third step rather than by means of the isothiourea starting material used in the first step. In such a case the second step will be deliberately conducted to yield the oxazindione as the main product. This second step may be carried out utilising any of the common mineral acids such as hydrochloric, sulphuric and phosphoric acids, in aqueous solution, preferably at elevated temperatures, such as, for instance, at 50–150° C. The refluxing temperature of the mixture at atmospheric pressure is a very suitable temperature. Both hydrochloric acid and sulphuric acid give good results when the aqueous acid solution is of 2–40% concentration by weight and these acids are preferred for the hydrolysis on account of their cheapness and availability. The oxazindione which is deposited on cooling may be recrystallised from a suitable solvent, such as petroleum ether.

The third step of the process comprising reacting an oxazindione with an amino compound is preferably carried out in a diluent medium which is a solvent for both the oxazindione and the amino compound, and the use of such a medium is more or less essential if the amino compound is normally gaseous. Suitable diluent media include water and the lower aliphatic alcohols such as methanol, ethanol, isopropanol, tert-butanol and 2-pentanol. The temperatures at which the reaction may be carried out are not critical, providing that in the case of a normally gaseous amine undue loss of this component is minimised by avoiding too high temperatures. The reaction proceeds smoothly at room temperatures, for instance 15–30° C., and there is no special advantage in using temperatures appreciably higher or lower than this.

As starting materials for the first step may be mentioned N:N′:S - trimethylisothiourea, N:N′ - diethyl - S - methylisothiourea, S-methyl-N:N′-diphenylisothiourea, S-ethyl-N:N′-diphenylisothiourea, S-benzyl-N:N′-diphenylisothiourea, N-S-dimethyl-N′-phenylisothiourea, S-ethyl-N-methyl-N′-phenylisothiourea, N:N′-dibenzyl-S-octylisothiourea, N:N′ - dioctyl - S - (betaphenylethyl)isothiourea, N-ethyl-S-methyl-N′-naphthylisothiourea and N-benzyl-S-methyl-N′-phenylisothiourea. The starting materials may be prepared by the reaction of the corresponding substituted thiourea and alkyl iodide, bromide, chloride or sulphate, according to the general method, cf. Organic Chemistry—Gilman, vol. I (1942) p. 841. Suitable amino compounds for the third step are, for instance, alkylamines such as methylamine, ethylamine, isopropylamine, n-octylamine, aralkylamines such as benzylamine and betaphenylethylamine, and also ammonia.

The uracils produced in accordance with the process of the invention may be recovered simply by evaporation of the reaction mixture and isolation of the crystalline material by, for instance, filtration, followed if required by recrystallisation.

The following examples in which the parts by weight bear the same relation to parts by volume as do grams to cubic centimetres, indicate the manner in which the invention may be carried out in practice.

EXAMPLE 1

1st step 44 parts by weight of N:N′-diethyl-S-methylisothiourea, prepared from diethylthiourea and methyl iodide, were dissolved in 50 parts by volume of benzene and the mixture heated under reflux while 26 parts by weight of 97% by weight diketene were added over a period of half an hour. After refluxing for a further half an hour, the benzene was evaporated to give 55 parts by weight of an oil which on vacuum distillation gave the pure 3-ethyl-2-ethylimino-2:3-dihydro-6-methyl-1:3(4)-oxazin-4-one as a yellow oil of boiling point 90–93° C. at a pressure of 1 mm. of mercury which subsequently solidified giving 42.1 parts by weight of a solid of melting point 30° C. analysing approximately in agreement with the formula $C_9H_{14}O_2N_2$.

2nd step 2.3 parts by weight of the imino oxazinone prepared above was refluxed with a mixture of concentrated hydrochloric acid (1 part by volume) and water (10 parts by volume) for 15 minutes. The oil rapidly dissolved in the hot acid but after a few minutes an oil was redeposited. On cooling 1.1 parts by weight of a white solid was deposited which on recrystallisation from petroleum ether gave 3-ethyl-2:3-dihydro-6-methyl-1:3(4)-oxazin-2:4-dione, melting at 69 to 70° C. and analysing approximately in agreement with the formula $C_7H_9O_3N$. Addition of alkali to the aqueous filtrate afforded a volatile basic substance identified as ethylamine.

The hydrolysis was also carried out using an equivalent amount of sulphuric acid instead of hydrochloric acid. Similar results were obtained.

3rd step (a) 0.1 part by weight of 3-ethyl-2:3-dihydro-6-methyl-1:3(4)-oxazin-2:4-dione was treated with 10 parts by volume of aqueous ammonia solution (S. G. 0.880) and the mixture subsequently evaporated to give crystals of 1-ethyl-4-methyluracil, melting at 206° C.

(b) The above example was repeated using 40% solution of ethylamine instead of the aqueous ammonia. 1:3-diethyl-4-methyluracil was deposited as an oil which crystallised from ether as plates melting at 50–51° C.

EXAMPLE 2

1st step 24.2 parts by weight of S-methyl-N:N′-diphenylisothiourea prepared from diphenylthiourea and methyl iodide were dissolved in 100 parts by volume of benzene and the mixture heated under reflux while 8.4 parts by weight of 98% by weight diketene were added over a period of half an hour. After refluxing for a further period of 5 hours the mixture was filtered to remove a small amount of insoluble material and cooled, yielding 18.9 parts by weight of a white crystalline solid melting at 180° C. Recrystallisation of this material from ethyl acetate gave 2:3-dihydro-6-methyl-3-phenyl-2-phenylimino-1:3(4)-oxazin-4-one as prisms melting at 184–5° C. and analysing approximately in agreement with the formula $C_{17}H_{14}O_2N_2$.

A similar preparation using S-ethyl-N:N-diphenylisothiourea gave the same product in a somewhat lower yield.

2nd step 2 parts by weight of the imino oxazinone obtained above were refluxed with hydrochloric acid of the same concentration as was used in Example 1 for a period of 20 minutes. On cooling 1.3 parts by weight of a solid was collected which on recrystallisation from methanol gave 2:3-dihydro-6-methyl-3-phenyl-1:3(4)-oxazin-2:4-dione as needles melting at 170° C. and analysing approximately in agreement with the formula $C_{11}H_9O_3N$.

3rd step 0.1 part by weight of 2:3-dihydro-6-methyl-3-phenyl-1:3(4)-oxazin-2:4-dione was warmed with 10 parts by volume of 40% aqueous methylamine solution in which it quickly dissolved. On evaporation, crystals of 3:4-dimethyl-1-phenyluracil, melting at 210° C. were obtained. The identity of this compound with an authentic sample was checked by a mixed melting point determination.

EXAMPLE 3

1st step 34.5 parts by weight of N:S-dimethyl-N′-phenylisothiourea were dissolved in 50 parts by volume of benzene and the mixture heated under reflux while 16.5 parts by weight of 98% by weight diketene were added over a period of half an hour. After refluxing for a further 3 hours the product was evaporated to give 42 parts by weight of an oil which on rubbing with ether-petroleum ether mixture gave 35 parts by weight of a pale brown solid which on recrystallisation from aqueous methanol gave 2:3 - dihydro - 3:6 - dimethyl - 2 - phenylimino-1:3(4)-oxazin-4-one, melting at 69 to 70° C. and analysing approximately in agreement with the formula $$C_{12}H_{12}O_2N_2$$

2nd step 1 part by weight of the imino-oxazinone obtained above was refluxed with a mixture of concentrated hydrochloric acid (1 part by volume) and water (10 parts by volume) for 20 minutes. Chloroform extraction of the reaction mixture followed by extraction of the resultant solids with hot methanol gave a residue of a small amount of 1:4-dimethyl-3-phenyluracil, analysing approximately in agreement with the formula $C_{12}H_{12}O_2N_2$ and melting at 300°–302° C. after recrystallisation from water, together with a larger amount of 2:3-dihydro-3:6-dimethyl-1:3-(4)-oxazin-2:4-dione in the form of needles melting at 108–9° C. and analysing approximately in agreement with the formula 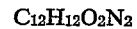$C_6H_7O_5N$.

Repetition of the above hydrolysis using 4 parts by volume of concentrated hydrochloric acid and 10 parts by volume of water to 10 parts by weight of the iminooxazinone yielded 0.28 part by weight of the uracil and 5.63 parts by weight of the oxazindione.

*3rd step*

(a) 0.2 part by weight of 2:3-dihydro-3:6-dimethyl-1:3(4)-oxazin-2:4-dione was warmed with 10 parts by volume of aqueous ammonia (S. G. 0.880) and the reaction mixture evaporated to a small bulk to give a white solid melting at 274° C. The identity of this solid with an authentic sample of 1:4-dimethyluracil was checked by a mixed melting point determination.

(b) 0.1 part by weight of 2:3-dihydro-3:6-dimethyl-1:3(4)-oxazin-2:4-dione was warmed with 5 parts by volume of 40% aqueous methylamine and evaporated to dryness to give needles melting at 110° C. The identity of this was checked with an authentic sample of 1:3:4-trimethyluracil by a mixed melting point determination.

(c) The above oxazindione (1.4 parts by weight) was refluxed with benzylamine (1.2 parts by weight) in ethanol (10 parts by volume) for 2 hours followed by removal of solvents. Crystallisation of the product from ether gave 3-benzyl-1:4-dimethyluracil (0.85 part by weight), melting point 82–3° C.

EXAMPLE 4

*1st step*

95% by weight diketene (17.7 parts by volume) was added over 0.5 hour to a boiling agitated solution of N-benzyl N'-phenyl S-methyl isothiourea (51 parts by weight) in ethylene dichloride (50 parts by volume) and the mixture refluxed for 2 hours; methanethiol was evolved. Removal of solvent gave a dark oil which solidified. Crystallisation from aqueous methanol gave 3-benzyl - 2:3 - dihydro - 6 - methyl - 2 - phenylimino-1:3(4)-oxazin-4-one (45 parts by weight) as needles, melting point 77° C. corresponding to a yield of 77% by weight.

*2nd step*

Hydrolysis of the above product (5 parts by weight) with boiling conc. hydrochloric acid (10 parts by volume) for 0.5 hr. gave both 3-benzyl-2:3-dihydro-6-methyl-1:3-(4)-oxazin-2:4-dione (1.1 parts by weight), which crystallised from benzene-petroleum ether as prisms, melting point 93° C. and 1-benzyl-4-methyl-3-phenyluracil (1.4 parts by weight), which crystallised from ethanol as needles, melting point 226–7° C. Repetition of the above hydrolysis with less hydrochloric acid (2 parts by volume) and the addition of water (10 parts by volume) gave 0.36 part by weight of the oxazindione and 2.55 parts by weight of the uracil. Separation was effected by extraction of the oxazindione with hot water.

*3rd step*

(a) The above oxazindione (0.1 part by weight) on boiling for 10 minutes with ammonium hydroxide (3 parts by volume, s. g. 0.880) followed by concentration, deposited plates, melting point 198° C., of 1-benzyl-4-methyluracil.

(b) Similar treatment using methylamine (3 parts by volume of 30% solution) gave 1-benzyl-3:4-dimethyluracil, melting point 166–7° C.

EXAMPLE 5

*1st step*

A solution of S-benzyl diphenylisothiourea (63.1 parts by weight) in 100 parts by volume of toluene was treated with diketene (17.3 parts by weight) with agitation and reflux. After boiling for 4 hours, when alpha-toluenethiol was evolved, the solvents were removed to give an oil which, on rubbing with benzene, gave 2:3-dihydro-6 - methyl - 3 - phenyl - 2 - phenylimino - 1:3(4) - oxazin-4-one (20 parts by weight, 36% yield).

I claim:

1. A process for the production of a 4-methyluracil which comprises the step of reacting diketene with an isothiourea of the formula

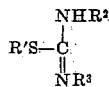

wherein R' is selected from the group consisting of hydrogen, alkyl containing up to eight carbon atoms and lower aralkyl, and each of $R^2$ and $R^3$ is selected from the group consisting of alkyl containing up to eight carbon atoms, lower aralkyl, and mononuclear and fused binuclear carbocyclic aryl, the reaction being carried out in an inert diluent which is a solvent for the starting materials and at a temperature in the range of about 40° to about 200° C.

2. A process for the production of a 4-methyluracil which comprises the step of heating an oxazinone of the formula

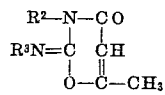

with an aqueous strong mineral acid solution where, in the foregoing formula, each of $R^2$ and $R^3$ is selected from the group consisting of alkyl containing up to eight carbon atoms, lower aralkyl, and mononuclear and fused binuclear carbocyclic aryl, the said mineral acid solution being of about 2% to about 40% concentration by weight.

3. A process according to claim 2, wherein the mineral acid is selected from the group consisting of hydrochloric acid and sulphuric acid.

4. A process for the production of a 4-methyluracil which comprises the step of reacting an oxazindione of the formula

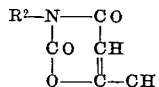

with an amino compound of the formula $RHN_2$ where, in the foregoing formulae, $R^2$ is selected from the group consisting of alkyl containing up to eight carbon atoms, lower aralkyl, and mononuclear and fused binuclear carbocyclic aryl, and R is selected from the group consisting of alkyl containing up to eight carbon atoms and lower aralkyl, the reaction being carried out in a diluent medium which is a solvent for the oxazindione and for the amino compound.

5. A process for the production of a 4-methyluracil which comprises the steps of reacting diketene with an isothiourea of the formula

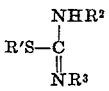

wherein R' is selected from the group consisting of alkyl containing up to eight carbon atoms and lower aralkyl, and each of $R^2$ and $R^3$ is selected from the group consisting of alkyl containing up to eight carbon atoms, lower aralkyl, and mononuclear and fused binuclear aryl, whereby an oxazinone is formed, and heating the latter compound with an aqueous strong mineral acid solution.

6. A process according to claim 5, wherein any oxazindione which has been formed is reacted with an amino compound whereby a 4-methyluracil is produced, said oxazindione and amino compound respectively having the formulae

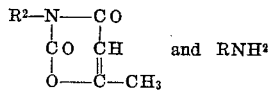

wherein $R^2$ is selected from the group consisting of alkyl containing up to eight carbon atoms, lower aralkyl, and mononuclear and fused aryl, and R is selected from the group consisting of alkyl containing up to eight carbon atoms and lower aralkyl.

7. An oxazinone of the formula

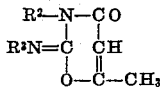

wherein each of $R^2$ and $R^3$ are selected from the group consisting of alkyl containing up to eight carbon atoms, lower aralkyl, and mononuclear and fused binuclear carbocyclic aryl.

8. An oxazindione of the formula

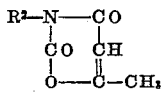

wherein $R^2$ is selected from the group consisting of alkyl containing up to eight carbon atoms, lower aralkyl, and mononuclear and fused binuclear carbocyclic aryl.

References Cited in the file of this patent
UNITED STATES PATENTS

| | | |
|---|---|---|
| 2,138,756 | Boese | Nov. 29, 1938 |
| 2,174,239 | Gleason | Sept. 26, 1939 |
| 2,375,735 | Moos et al. | May 8, 1945 |